United States Patent
Choi et al.

(10) Patent No.: US 9,023,747 B2
(45) Date of Patent: May 5, 2015

(54) DIELECTRIC COMPOSITION AND PREPARATION METHOD THEREOF

(71) Applicant: Samsung Electro-Mechanics Co., Ltd., Suwon, Gyunggi-do (KR)

(72) Inventors: Chang Hak Choi, Gyunggi-do (KR); Chang Hoon Kim, Gyunggi-do (KR); Sang Min Youn, Seoul (KR); Kwang Hee Nam, Gyunggi-do (KR); Ki Myoung Yun, Gyunggi-do (KR); Hyung Joon Jeon, Gyunggi-do (KR); Jong Hoon Yoo, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 0 days.

(21) Appl. No.: 13/920,810

(22) Filed: Jun. 18, 2013

(65) Prior Publication Data

US 2014/0135203 A1 May 15, 2014

(30) Foreign Application Priority Data

Nov. 15, 2012 (KR) ........................ 10-2012-0129381

(51) Int. Cl.
| | |
|---|---|
| C04B 35/00 | (2006.01) |
| C04B 35/468 | (2006.01) |
| C04B 35/49 | (2006.01) |
| B82Y 30/00 | (2011.01) |

(52) U.S. Cl.
CPC .............. *C04B 35/4682* (2013.01); *C04B 35/49* (2013.01); *C04B 2235/3215* (2013.01); *C04B 2235/3224* (2013.01); *C04B 2235/3225* (2013.01); *C04B 2235/5445* (2013.01); *C04B 2235/5454* (2013.01); *C04B 2235/5472* (2013.01); *C04B 2235/652* (2013.01); *B82Y 30/00* (2013.01)

(58) Field of Classification Search
CPC .... C04B 35/46; C04B 35/495; C04B 35/465; C04B 35/4682
USPC .................. 501/134, 135, 136, 137, 138, 139
See application file for complete search history.

(56) References Cited

U.S. PATENT DOCUMENTS 4,885,267 A * 12/1989 Takahara et al. .............. 501/134
2006/0216512 A1 9/2006 Fujikawa et al.

FOREIGN PATENT DOCUMENTS

| JP | 2006-298746 A | 11/2006 |
|---|---|---|
| JP | 2007-091549 A | 4/2007 |

* cited by examiner

*Primary Examiner* — Noah Wiese
(74) *Attorney, Agent, or Firm* — McDermott Will & Emery LLP

(57) ABSTRACT

There are provided a dielectric composition and a preparation method thereof, the dielectric composition including: a first perovskite powder for a core represented by $ABO_3$: and a second perovskite powder for a shell represented by $ABO_3$, having an average particle diameter corresponding to $1/3$ to $1/10$ of an average particle diameter of the first perovskite powder, and included in an amount of 1 to 70 parts by weight with respect to 100 parts by weight of the first perovskite powder, wherein particles of the second perovskite powder have pores having a volume fraction of 3 to 50 vol % therein. According to the present invention, there are provided a dielectric composition having excellent dielectric characteristics and electrical characteristics, and a preparation method thereof.

10 Claims, 3 Drawing Sheets

```
┌─────────────────────────────────────────────────┐
│          PREPARE MIXTURE BY MIXING FIRST        │
│  PEROVSKITE POWDER FOR CORE REPRESENTED BY ABO3,│
│   SECOND PEROVSKITE POWDER FOR SHELL HAVING     │
│         AVERAGE PARTICLE DIAMETER               │
│          CORRESPONDING TO                       │
│   1/3 TO 1/10 OF AVERAGE PARTICLE DIAMETER OF   │
│   FIRST PEROVSKITE POWDER AND INCLUDIED IN      │
│   AMOUNT OF 1 TO 70 PARTS BY WEIGHT WITH        │
│   RESPECT TO 100 PARTS BY WEIGHT                │
│     OF FIRST PEROVSKITE POWDER, AND ADDITIVE    │
└─────────────────────────────────────────────────┘
                         │
                         ▼
┌─────────────────────────────────────────────────┐
│                  FIRE MIXTURE                   │
└─────────────────────────────────────────────────┘
```

FIG. 4

DIELECTRIC COMPOSITION AND PREPARATION METHOD THEREOF

CROSS-REFERENCE TO RELATED APPLICATIONS

This application claims the priority of Korean Patent Application No. 10-2012-0129381 filed on Nov. 15, 2012, in the Korean Intellectual Property Office, the disclosure of which is incorporated herein by reference.

BACKGROUND OF THE INVENTION

1. Field of the Invention

The present invention relates to a dielectric composition having excellent dielectric characteristics and electrical characteristics and a preparation method thereof.

2. Description of the Related Art

In accordance with the recent trend for high performance, slim and light devices within the electronics industry, high performance, miniaturization, and weight reductions have been demanded in electronic components. In particular, as computer central processing units (CPUs) have increased in speed and devices have been slimmed lightened, digitalized and multi-functionalized, research into technology for implementing characteristics such as miniaturization, thinning, high capacitance, low impedance within a high frequency region, and the like, in a multilayered ceramic capacitor (MLCC) has been actively conducted.

A perovskite powder, used as a material for a dielectric layer of an MLCC, has largely been prepared using a solid state reaction method, a co-precipitation method, or the like. However, since these methods produce crystalline structures in a high temperature calcination process, the high temperature calcination process and a grinding process are required, and the crystalline particle size is irregular.

The dielectric layer configuring the multilayered ceramic capacitor is required to be relatively thin in order to implement miniaturization and high capacitance in the MLCC. In the case in which the dielectric layer is thinned, when the perovskite power has a relatively large particle diameter, surface roughness of the dielectric layer is increased, and a short-circuit ratio is increased, such that an insulation defect may be generated.

Therefore, a fine-grained perovskite power has been demanded.

Meanwhile, in the case of manufacturing an MLCC using the fine-grained powder, it is necessary to perform a firing process at a high temperature to improve density of the ceramic powder or induce particle growth, in order to implement desired MLCC characteristics.

Here, as the powder contains fine grains, particle growth may be rapidly generated during a firing process.

In the case in which the particle growth is rapidly generated, it is difficult to control conditions to allow for the implementation of a uniformly fine structure in the dielectric layer, and it is difficult to secure a high degree of electrical reliability.

Further, as the powder contains relatively small particles, solidification with added components during the firing process is easily generated.

In the case in which solidification is excessive, a volume ratio of a pure ceramic powder capable of exhibiting dielectric characteristics of the final product is decreased, such that a dielectric constant may be deteriorated.

The final multilayered ceramic electronic component may have a fine structure including a core formed of pure ceramic powder and a shell formed of ceramic powder with an additive dissolved therein, such that the fine structure is referred to as a core-shell structure.

In general, the additive is coated on a surface of the ceramic powder, or the ceramic powder having the core-shell structure is prepared in order to have a uniform core-shell structure.

However, coating the additive on the surface of the ceramic powder may be defective, in that a coating layer may be flaked off during the firing process or there may be no remaining coating layer in the final fired body because of rearrangement due to diffusion.

In addition, in the case of using the ceramic powder having the core-shell structure, since a crystallographic-orientation of the core part and that of the shell part are different, a change in the dielectric constant may be high, depending on a temperature, and a combination of the additive and the ceramic powder is broken, such that the particle size may be non-uniform.

RELATED ART DOCUMENT (Patent Document 1) Japanese Patent Laid-Open Publication No. JP 2006-298746

SUMMARY OF THE INVENTION

An aspect of the present invention provides a dielectric composition having excellent dielectric characteristics and electrical characteristics and a preparation method thereof.

According to an aspect of the present invention, there is provided a dielectric composition including: a first perovskite powder for a core represented by $ABO_3$: and a second perovskite powder for a shell represented by $ABO_3$, having an average particle diameter corresponding to $\frac{1}{3}$ to $\frac{1}{10}$ of an average particle diameter of the first perovskite powder, and included in an amount of 1 to 70 parts by weight with respect to 100 parts by weight of the first perovskite powder, wherein particles of the second perovskite powder have pores having a volume fraction of 3 to 50 vol % therein.

The A may include at least one selected from a group consisting of barium (Ba), strontium (Sr), lead (Pb), and calcium (Ca).

The B may include at least one selected from a group consisting of titanium (Ti) and zirconium (Zr).

The perovskite powder may be one selected from a group consisting of $BaTiO_3$, $BaTi_xZr_{1-x}O_3$, $Ba_xY_{1-x}TiO_3$, $Ba_xDy_{1-x}TiO_3$, and $Ba_xHo_{1-x}TiO_3$ (0<x<1).

A frequency of pores included in particles of the first perovskite powder may be less than 5, based on particles having a particle diameter of 200 nm in the first perovskite powder.

A frequency of the pores included in the particles of the second perovskite powder may be 20 to 300, based on particles having a particle diameter of 10 to 80 nm in the second perovskite powder.

According to another aspect of the present invention, there is provided a preparation method of a dielectric composition, the preparation method including: preparing a mixture by mixing a first perovskite powder for a core represented by $ABO_3$, a second perovskite powder for a shell represented by $ABO_3$, having an average particle diameter corresponding to $\frac{1}{3}$ to $\frac{1}{10}$ of an average particle diameter of the first perovskite powder, and included in an amount of 1 to 70 parts by weight with respect to 100 parts by weight of the first perovskite powder, and an additive; and firing the mixture.

The perovskite powder may be one selected from a group consisting of $BaTiO_3$, $BaTi_xZr_{1-x}O_3$, $Ba_xY_{1-x}TiO_3$, $Ba_xDy_{1-x}TiO_3$, and $Ba_xHo_{1-x}TiO_3$ (0<x<1).

The A may include at least one selected from a group consisting of barium (Ba), strontium (Sr), lead (Pb), and calcium (Ca).

The B may include at least one selected from a group consisting of titanium (Ti) and zirconium (Zr).

The particles of the second perovskite powder have pores having a volume fraction of 3 to 50 vol % therein.

A frequency of pores included in particles of the first perovskite powder may be less than 5, based on particles having a particle diameter of 200 nm in the first perovskite powder.

A frequency of pores included in particles of the second perovskite powder may be 20 to 300 based on particles having a particle diameter of 10 to 80 nm in the second perovskite powder.

The firing of the mixture may be performed under a reduction atmosphere.

BRIEF DESCRIPTION OF THE DRAWINGS

The above and other aspects, features and other advantages of the present invention will be more clearly understood from the following detailed description taken in conjunction with the accompanying drawings, in which:

FIG. 4 is a process flowchart illustrating a preparation method of a dielectric composition according to another embodiment of the present invention.

DETAILED DESCRIPTION OF THE EMBODIMENTS

Figure 1:
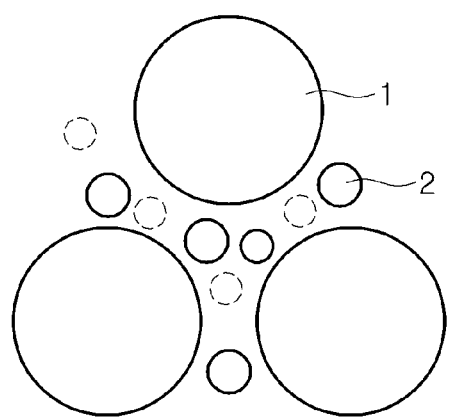
FIG. 1 is a schematic view illustrating an internal structure of a dielectric composition according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

FIG. 1 is a schematic view illustrating an internal structure of a dielectric composition according to an embodiment of the present invention.

Figure 2:
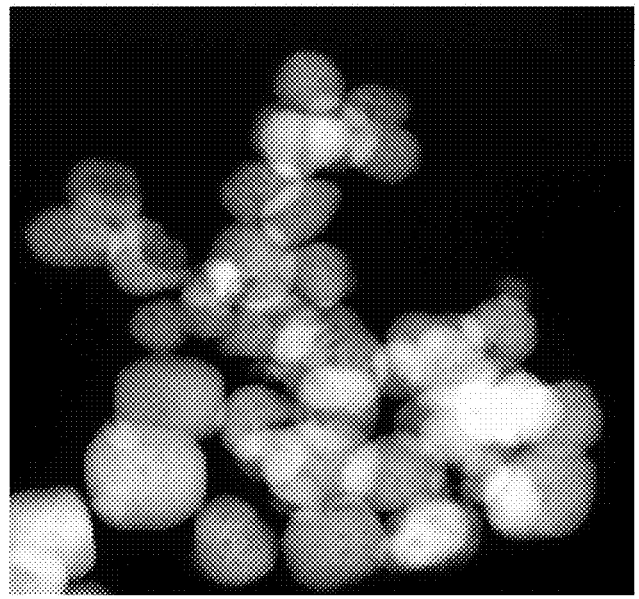
FIG. 2 is an image of a second perovskite powder crystal for a shell included in the dielectric composition according to the embodiment of the present invention imaged by a scanning electron microscope (SEM)

FIG. 2 is an image of a second perovskite powder crystal for a shell included in the dielectric composition according to the embodiment of the present invention imaged by a scanning electron microscope (SEM).

Figure 3:
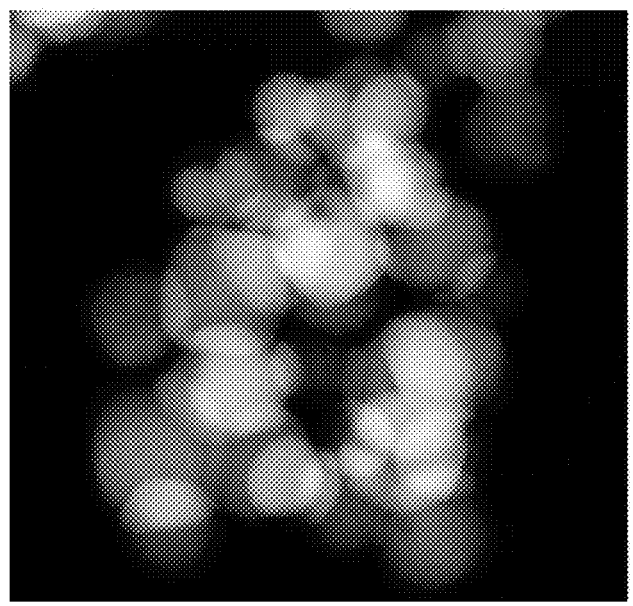
FIG. 3 is an image of a first perovskite powder crystal for a core included in the dielectric composition according to the embodiment of the present invention imaged by a scanning electron microscope (SEM)

FIG. 3 is an image of a first perovskite powder crystal for a core included in the dielectric composition according to the embodiment of the present invention imaged by a scanning electron microscope (SEM).

Referring to FIGS. 1 to 3, the dielectric composition according to the embodiment of the present invention may include a first perovskite powder 1 for a core represented by $ABO_3$, and a second perovskite powder 2 for a shell represented by $ABO_3$, having an average particle diameter corresponding to $1/3$ to $1/10$ of an average particle diameter of the first perovskite powder 1, and included in an amount of 1 to 70 parts by weight with respect to 100 parts by weight of the first perovskite powder 1, wherein particles of the second perovskite powder 2 include pores having a volume fraction of 3 to 50 vol % therein.

Hereinafter, the dielectric composition according to the embodiment of the present invention will be described in detail, but is not limited thereto.

The dielectric composition according to the embodiment of the present invention may include the first perovskite powder 1 for a core represented by $ABO_3$, and the second perovskite powder 2 for a shell represented by $ABO_3$, having an average particle diameter corresponding to $1/3$ to $1/10$ of an average particle diameter of the first perovskite powder 1, and included in an amount of 1 to 70 parts by weight with respect to 100 parts by weight of the first perovskite powder 1.

In general, the dielectric composition may have an additive coated on a surface of ceramic powder having a perovskite structure or may include ceramic powder having a core-shell structure.

However, coating the additive on the surface of the ceramic powder may be defective in that a coating layer is broken during a firing process or there is no remaining coating layer in the final fired body because of rearrangement due to diffusion.

In addition, in the case of using the ceramic powder having the core-shell structure, since a crystallographic-orientation of a core part and that of a shell part are different, a change in dielectric constant may be relatively high depending on a temperature, and a combination of the additive and the ceramic powder may be broken, such that the particle diameter thereof may be irregular.

The dielectric composition according to the embodiment of the present invention may include the first perovskite powder 1 for a core represented by $ABO_3$, and the second perovskite powder 2 for a shell represented by $ABO_3$, having an average particle diameter corresponding to $1/3$ to $1/10$ of an average particle diameter of the first perovskite powder 1, and included in an amount of 1 to 70 parts by weight with respect to 100 parts by weight of the first perovskite powder 1, whereby the core-shell structure having a uniform particle diameter after a final firing process is performed may be obtained.

More specifically, at the time of the firing process, the core and the shell may be formed by dissolving a fine-grain ceramic powder with an additive at a high temperature to cause a crystal growth on the surface of the ceramic powder having a large particle diameter.

Here, the fine-grained ceramic powder needs to be easily dissolved for particle growth of the shell and thus, be dissolved with the additive, while the ceramic powder having a large particle diameter to be used for the core may not be easily dissolved.

In general, ceramic powder having a large particle diameter forms a core, and ceramic powder having a small particle diameter forms a shell. However, since the ceramic powder does not have uniform particle size distribution, a boundary between the ceramic powder having a small particle diameter and the ceramic powder having a large particle diameter is unclear, and a difference in solubility between powder particles may not be large, such that it may be difficult to differentiate and control the powder particles.

Therefore, the ceramic powder having a large particle diameter for forming a core may be controlled to have a large particle diameter and a low solubility, while the ceramic powder having a small particle diameter for forming a shell may be controlled to have a small particle diameter and a high solubility.

By controlling the ceramic powder as described above, a fraction between the ceramic powder for a shell and the ceramic powder for a core is controlled, such that a desired volume fraction of the core and the shell (hereinafter, referred to as "a core-shell volume fraction") may be controlled.

The core-shell volume fraction may indicate a ratio of volume of the core and volume of the shell in the ceramic powder included in the dielectric composition.

According to the embodiment of the present invention, the second perovskite powder 2 for a shell may have an average particle diameter corresponding to $\frac{1}{3}$ to $\frac{1}{10}$ of an average particle diameter of the first perovskite powder 1 for a core, but is not limited thereto.

In the case in which the second perovskite powder 2 for a shell has a particle diameter greater than $\frac{1}{3}$ of the average particle diameter of the first perovskite powder 1 for a core, a difference in particle diameter is small, such that the boundary between the ceramic powder having a small particle diameter and the ceramic powder having a large particle diameter is unclear, and a difference in solubility between powder particles may not be large, whereby it may be difficult to differentiate and control the powder particles.

In the case in which the second perovskite powder 2 for a shell has a particle diameter less than $\frac{1}{10}$ of the average particle diameter of the first perovskite powder 1 for a core, a difference in particle diameter between powder particles may be high, such that it may be difficult to manufacture a multi-layered ceramic electronic component having a uniform particle size distribution after the firing process is performed.

The first perovskite powder and the second perovskite powder respectively have a structure represented by $ABO_3$, wherein the A may include at least one selected from a group consisting of barium (Ba), strontium (Sr), lead (Pb), and calcium (Ca), but is not limited thereto.

In addition, the B may include at least one selected from a group consisting of titanium (Ti) and zirconium (Zr), but is not limited thereto.

Each of the first perovskite powder and the second perovskite powder is not particularly limited, but may be one selected from a group consisting of $BaTiO_3$, $BaTi_xZr_{1-x}O_3$, $Ba_xY_{1-x}TiO_3$, $Ba_xDy_{1-x}TiO_3$, and $Ba_xHo_{1-x}TiO_3$ (0<x<1).

According to the embodiment of the present invention, the dielectric composition may include the second perovskite powder 2 for a shell in an amount of 1 to 70 parts by weight with respect to 100 parts by weight of the first perovskite powder 1 for a core.

As described above, a content ratio of the first perovskite powder for a core and the second perovskite powder for a shell is controlled, whereby ceramic powder having a uniform particle diameter may be obtained.

In the case in which the second perovskite powder for a shell has a content less than 1 part by weight with respect to 100 parts by weight of the first perovskite powder for a core, a change in a dielectric constant depending on a temperature may be large, such that there may be a problem in reliability.

In the case in which the second perovskite powder for a shell has a content higher than 70 parts by weight with respect to 100 parts by weight of the first perovskite powder for a core, the dielectric constant may be deteriorated.

Meanwhile, according to the embodiment of the present invention, the particles of the second perovskite powder 2 may include pores having a volume fraction of 3 to 50 vol % therein.

The particles of the second perovskite powder 2 include pores, and the volume fraction of the pores is controlled to be 3 to 50 vol %, whereby the ceramic powder having a uniform particle diameter may be produced, and a volume ratio of the core and the shell may be precisely controlled.

The volume fraction of the pores may indicate a ratio of a volume of the pores to a predetermined volume of the particles of the second perovskite powder.

In the case in which the volume fraction of the pores is less than 3 vol %, the volume of the pores included in the particles of the second perovskite powder for a shell is small, such that a difference in solubility between the second perovskite powder for a shell and the first perovskite powder for a core may not be high, whereby the volume ratio of the core and the shell may not be precisely controlled.

In the case in which the volume fraction of the pores is more than 50 vol %, the volume of the pores included in the particles of the second perovskite powder for a shell may be excessively large, to decrease the content of the second perovskite powder for a shell, such that the dielectric constant may be deteriorated depending on a temperature.

Meanwhile, in the case of the first perovskite powder 1, the number of particles including the pores is less than that of the second perovskite powder. A frequency of the pores included in the particles of the first perovskite powder 1 is not limited, but may be less than 5, based on particles having a particle diameter of 200 nm in the first perovskite powder 1.

The frequency of the pores may be defined as the number of particles including pores among particles having a standard particle diameter in the first perovskite powder or the second perovskite powder.

That is, the frequency of the pores included in the particles of the first perovskite powder 1 may be less than 5 based on the particles having a particle diameter of 200 nm as described above.

The frequency of the pores included in the particles of the second perovskite powder 2 may be 20 to 300 based on the particle having a particle diameter of 10 to 80 nm in the second perovskite powder 2, but is not limited thereto.

As described above, the frequency of the pores included in the particles of the second perovskite powder 2 is controlled to be increased as compared to the frequency of the pores included in the particles of the first perovskite powder 1, whereby the ceramic powder having a uniform particle diameter may be produced, and the volume ratio of the core and the shell may be precisely controlled.

FIG. 2 is an image of the second perovskite powder crystal for a shell included in the dielectric composition according to the embodiment of the present invention imaged by a scanning electron microscope (SEM).

FIG. 3 is an image of the first perovskite powder crystal for a core included in the dielectric composition according to the embodiment of the present invention imaged by a scanning electron microscope (SEM).

Referring to FIGS. 2 and 3, it may be appreciated that particles of the second perovskite powder for a shell may generate more pores than those of the first perovskite powder for a core, and have a porous form.

A preparation method of a dielectric composition according to another embodiment of the present invention may include preparing a mixture by mixing a first perovskite powder for a core represented by $ABO_3$, a second perovskite powder for a shell represented by $ABO_3$, having an average particle diameter corresponding to $\frac{1}{3}$ to $\frac{1}{10}$ of an average particle diameter of the first perovskite powder, and included in an amount of 1 to 70 parts by weight with respect to 100 parts by weight of the first perovskite powder, and an additive; and firing the mixture.

The perovskite powder may be one selected from a group consisting of $BaTiO_3$, $BaTi_xZr_{1-x}O_3$, $Ba_xY_{1-x}TiO_3$, $Ba_xDy_{1-x}TiO_3$, and $Ba_xHo_{1-x}TiO_3$ (0<x<1).

The A may include at least one selected from a group consisting of barium (Ba), strontium (Sr), lead (Pb), and calcium (Ca).

The B may include at least one selected from a group consisting of titanium (Ti) and zirconium (Zr).

The second perovskite powder may include the pores having a volume fraction of 3 to 50 vol %.

The frequency of the pores included in the particles of the first perovskite powder may be less than 5 based on particles having a particle diameter of 200 nm in the first perovskite powder.

The frequency of the pores included in the particles of the second perovskite powder may be 20 to 300 based on particles having a particle diameter of 10 to 80 nm in the second perovskite powder.

The firing of the mixture may be performed under a reduction atmosphere.

Hereinafter, the preparation method of the dielectric composition according to another embodiment of the present invention will be described. However, descriptions overlapped with descriptions of the dielectric composition according to the embodiment of the present invention as provided above will be omitted.

Firstly, the first perovskite powder for a core represented by $ABO_3$, and the second perovskite powder for a shell having an average particle diameter corresponding to ⅓ to 1/10 of the average particle diameter of the first perovskite powder were prepared, respectively.

The first perovskite powder for a core and the second perovskite powder for a shell may be different from each other only in terms of the particle diameter thereof, but may be prepared to have the same composition. In addition, the first perovskite powder for a core and the second perovskite powder for a shell are not limited thereto.

The first and second perovskite powders may be prepared by a general preparation method of a perovskite powder. That is, the preparation method thereof is not particularly limited.

Firstly, a hydrous metal oxide may be washed to remove impurities therefrom.

The hydrous metal oxide may be at least one selected from a group consisting of hydrous titanium and hydrous zirconium.

Titania and zirconia may be easily hydrolyzed, such that hydrous titanium or hydrous zirconium is precipitated in a gel form at the time of mixing pure water with titania or zirconia without separate additives.

In order to wash the hydrous metal oxide to remove the impurities therefrom, pure water is added thereto such that a molar ratio of $H_2O$/metal is 10 or more, and agitation is performed thereon for 10 minutes to 10 hours to separate the impurities from the metal and precipitate a gel, and residual liquid is removed therefrom.

More specifically, the hydrous metal oxide is filtered under pressure to remove the residual liquid, and filtering is performed while pure water is added thereto, to thereby remove impurities present on the surfaces of particles thereof.

A gas formed during the agitation is removed by reducing pressure, or is effectively removed when air is supplied while pressure is reduced.

The hydrous metal oxide is filtered under pressure to remove the residual liquid, and filtering is performed while pure water is added thereto, to thereby remove the impurities present on the surfaces of the particles thereof.

Then, pure water and an acid or a base may be added to the hydrous metal oxide.

Pure water is added to the hydrous metal oxide powder obtained after the filtering process is performed and agitation is performed by using a high density agitator at a temperature of 0° C. to 60° C. for 0.1 to 72 hours to prepare hydrous metal oxide slurry.

An acid or a base is added to the prepared slurry, wherein the acid or the base may be added in an amount of 0.0001 to 0.2 mol based on an amount of the hydrous metal oxide, as a peptizing agent.

The acid is not particularly limited, as long as the acid is generally used. For example, the acid may be hydrochloric acid, nitric acid, sulfuric acid, phosphoric acid, formic acid, acetic acid, polycarboxylic acid, or the like, which may be used alone or in combination of at least two thereof.

The base is not particularly limited as long as the base is generally used. For example, the base is tetramethylammonium hydroxide or tetraethylammonium hydroxide, or the like, which may be used alone or in combination.

Then, the metal oxide sol may be mixed with a metal salt to form a perovskite particle core.

The metal salt may be barium hydroxide or a mixture of barium hydroxide and a rare earth salt.

The rare earth salt is not particularly limited, but yttrium (Y), dysprosium (Dy), holmium (Ho), or the like, may be used therefor.

The perovskite particle core may be formed at 60° C. to 150° C.

In forming the perovskite particle core, a mixing ratio (metal salt/metal oxide) of the reactant may be 1 to 4, or 1.2 to 2.

Then, a perovskite powder may be obtained through a particle growth of the perovskite particle core.

Next, the first perovskite powder for a core represented by $ABO_3$, the second perovskite powder for a shell represented by $ABO_3$, having an average particle diameter corresponding to ⅓ to 1/10 of an average particle diameter of the first perovskite powder, and included in an amount of 1 to 70 parts by weight with respect to 100 parts by weight of the first perovskite powder, and an additive may be mixed to prepare a mixture.

Then, the mixture may be fired to prepare a dielectric composition having a core-shell structure.

Hereinafter, although the present invention will be described in detail through Inventive Example and Comparative Example, this description is provided to help in a specific understanding of the present invention, and a scope of the present invention is not limited to the following Inventive Examples.

EXAMPLES

The first perovskite powder for a core represented by $ABO_3$ was prepared to have an average particle diameter of 200 nm, and the second perovskite powders for a shell represented by $ABO_3$ were prepared to have an average particle diameter of 10, 20, 50, and 80 nm, respectively.

In addition, contents of the second perovskite powders for a shell were controlled with respect to 100 parts by weight of the first perovskite powder, respectively.

The first perovskite powder, the second perovskite powders, and the additive were mixed together to prepare respective dielectric compositions.

COMPARATIVE EXAMPLE

Dielectric compositions according to the Comparative Example were prepared by the same method as the Inventive Example except that only the first and second perovskite powders having an average particle diameter of 200 nm were used.

Temperature coefficient of capacitance (TCC), a capacitance change rate depending on a temperature of 85° C., a dielectric constant, and breakdown voltage (BDV) were measured according to the Inventive Example and the Comparative Example. Results thereof are shown in Table 1 below.

TABLE 1

| | First Perovskite Powder Particle Diameter (nm) | Second Perovskite Powder Particle Diameter (nm) | Second Perovskite Powder Content (Parts by Weight) | 85° C. TCC $(C_{85° C.} - C_{25° C.})/C_{25° C.}$ (%) | Dielectric Constant | BDV (V/μm) |
|---|---|---|---|---|---|---|
| Comparative Example | 200 | — | — | −16 | 2300 | 90 |
| Inventive Example 1 | 200 | 10 | 11 | −16 | 2600 | 100 |
| Inventive Example 2 | 200 | 10 | 43 | −14 | 2800 | 120 |
| Inventive Example 3 | 200 | 20 | 11 | −14 | 2800 | 115 |
| Inventive Example 4 | 200 | 50 | 11 | −15 | 2600 | 105 |
| Inventive Example 5 | 200 | 80 | 11 | −14 | 2500 | 100 |

Referring to Table 1 above, it may be appreciated that all of Inventive Examples 1 to 5 had excellent results in view of TCC, the capacitance change rate depending on a temperature at 85° C., a dielectric constant, and BDV, as compared to Comparative Examples.

That is, it may be appreciated that the dielectric composition according to the embodiment of the present invention had excellent TCC, the capacitance change rate depending on a temperature at 85° C., a dielectric constant, and BDV to thereby exhibit excellent reliability.

As set forth above, according to the embodiment of the present invention, even in the case in which separate additive coating is not performed or composite powder having the core-shell structure is not prepared, two types of perovskite powders are mixed, whereby the dielectric composition having a core-shell structure and an uniform particle size distribution after the firing process can be obtained.

According to the embodiment of the present invention, the particle diameter ratio of the perovskite powder for a core and the perovskite powder for a shell and the frequency of the pores included in the particles may be controlled to increase selectivity in the growth of the core-shell particle and precisely control the ratio of the core and the shell.

As a result, the dielectric composition having the uniform particle diameter can be obtained, and the multilayered ceramic electronic component using the same can have excellent dielectric constant and improved reliability.

While the present invention has been shown and described in connection with the embodiments, it will be apparent to those skilled in the art that modifications and variations can be made without departing from the spirit and scope of the invention as defined by the appended claims.

What is claimed is:

1. A dielectric composition comprising:
   a first perovskite powder for a core represented by $ABO_3$: and
   a second perovskite powder for a shell represented by $ABO_3$, having an average particle diameter corresponding to ⅓ to ⅒ of an average particle diameter of the first perovskite powder, and included in an amount of 1 to 70 parts by weight with respect to 100 parts by weight of the first perovskite powder,
   wherein particles of the second perovskite powder have pores having a volume fraction of 3 to 50 vol % therein,
   A includes at least one selected from a group consisting of barium (Ba), strontium (Sr), lead (Pb), and calcium (Ca), and
   B includes at least one selected from a group consisting of titanium (Ti) and zirconium (Zr).

2. The dielectric composition of claim 1, wherein each of the first perovskite powder and the second perovskite powder is one selected from a group consisting of $BaTiO_3$, $BaTi_xZr_{1-x}O_3$, $Ba_xY_{1-x}TiO_3$, $Ba_xDy_{1-x}TiO_3$, and $Ba_xHo_{1-x}TiO_3$ (0<x<1).

3. The dielectric composition of claim 1, wherein a frequency of pores included in particles of the first perovskite powder is less than 5, based on particles having a particle diameter of 200 nm in the first perovskite powder.

4. The dielectric composition of claim 1, wherein a frequency of the pores included in the particles of the second perovskite powder is 20 to 300, based on particles having a particle diameter of 10 to 80 nm in the second perovskite powder.

5. A preparation method of a dielectric composition, the preparation method comprising:
   preparing a mixture by mixing a first perovskite powder for a core represented by $ABO_3$, a second perovskite powder for a shell represented by $ABO_3$, having an average particle diameter corresponding to ⅓ to ⅒ of an average particle diameter of the first perovskite powder, and included in an amount of 1 to 70 parts by weight with respect to 100 parts by weight of the first perovskite powder, and an additive; and
   firing the mixture,
   wherein A includes at least one selected from a group consisting of barium (Ba), strontium (Sr), lead (Pb), and calcium (Ca), and
   B includes at least one selected from a group consisting of titanium (Ti) and zirconium (Zr).

6. The preparation method of claim 5, wherein each of the first perovskite powder and the second perovskite powder is one selected from a group consisting of $BaTiO_3$, $BaTi_xZr_{1-x}O_3$, $Ba_xY_{1-x}TiO_3$, $Ba_xDy_{1-x}TiO_3$, and $Ba_xHo_{1-x}TiO_3$ ($0<x<1$).

7. The preparation method of claim 5, wherein particles of the second perovskite powder have pores having a volume fraction of 3 to 50 vol % therein.

8. The preparation method of claim 5, wherein a frequency of pores included in particles of the first perovskite powder is less than 5, based on particles having a particle diameter of 200 nm in the first perovskite powder.

9. The preparation method of claim 5, wherein a frequency of pores included in particles of the second perovskite powder is 20 to 300 based on particles having a particle diameter of 10 to 80 nm in the second perovskite powder.

10. The preparation method of claim 5, wherein the firing of the mixture is performed under a reduction atmosphere.

* * * * *